United States Patent
Mariman

(10) Patent No.: US 6,634,678 B2
(45) Date of Patent: Oct. 21, 2003

(54) SEED CONDUIT DETACHABLE COUPLER HAVING A SEED CUT OFF

(75) Inventor: Nathan Albert Mariman, Geneseo, IL (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 09/812,663

(22) Filed: Mar. 20, 2001

(65) Prior Publication Data

US 2002/0135182 A1 Sep. 26, 2002

(51) Int. Cl.$^7$ ................................................ F16L 37/00
(52) U.S. Cl. ........................................ 285/308; 285/320
(58) Field of Search ............................... 285/311, 319, 285/308, 320; 137/825, 829; 52/192, 197, 195; F16L 37/12

(56) References Cited

U.S. PATENT DOCUMENTS

| | | | | |
|---|---|---|---|---|
| 3,312,022 A | * | 4/1967 | Marriage | 52/195 |
| 4,444,419 A | * | 4/1984 | Maeshiba | 285/320 |
| 4,770,445 A | * | 9/1988 | Steer et al. | 285/110 |
| 4,795,197 A | | 1/1989 | Kaminski et al. | |
| 5,038,817 A | | 8/1991 | Henry et al. | |
| 5,092,255 A | | 3/1992 | Long et al. | |
| 5,123,677 A | * | 6/1992 | Kreczko et al. | 285/320 |
| 5,161,473 A | | 11/1992 | Landphair et al. | |
| 5,439,198 A | * | 8/1995 | Reed | 251/231 |
| 5,542,363 A | | 8/1996 | Gamino | |
| 5,568,946 A | | 10/1996 | Jackowski | |
| 5,799,986 A | | 9/1998 | Corbett et al. | |
| 5,938,071 A | * | 8/1999 | Sauder | 221/211 |
| 5,964,485 A | * | 10/1999 | Hame et al. | 285/308 |
| 5,984,378 A | | 11/1999 | Ostrander et al. | |
| 5,988,221 A | * | 11/1999 | Walker | 137/899 |
| 6,053,540 A | * | 4/2000 | Meyer | 285/320 |
| 6,240,986 B1 | * | 6/2001 | Berkes et al. | 141/346 |
| 6,378,555 B2 | * | 4/2002 | Kyle | 137/613 |

FOREIGN PATENT DOCUMENTS

| | | |
|---|---|---|
| EP | 0 758 523 A1 | 2/1997 |
| GB | 2077377 A * | 12/1981 |

* cited by examiner

Primary Examiner—Lynne H. Browne
Assistant Examiner—Aaron Dunwoody

(57) ABSTRACT

A detachable coupler for a seed carrying conduit comprises a first male portion and a second female portion. The first male portion is provided with a circumferential latching engagement channel. One side of the channel is defined by a circumferential latching rim having an angled surface and a latching surface. The second portion is provided with at least two tongs. The tongs are provided with latches for engaging the latching channel. The second portion is also provided with a seed cut off comprising a sliding gate. The gate is slidably positioned in a slot formed in a tower integral with the second portion.

20 Claims, 2 Drawing Sheets

SEED CONDUIT DETACHABLE COUPLER HAVING A SEED CUT OFF

FIELD OF THE INVENTION

The present invention is directed to a detachable coupler for a seed carrying conduit having a seed cut off.

BACKGROUND OF THE INVENTION

As seeding machines have gotten larger and the operator is forced to plant more acreage various ways have been explored to increase operator efficiency. In some applications a centralized main seed hopper holds the seed, and from this hopper seed is dispersed to individual planting units or directly to the planting furrow.

SUMMARY

It is an object of the present invention to provide a simple and effective detachable coupler for a seed carrying conduit that is also provided with a simple and effective seed cut off.

The detachable coupler has a first portion and a second portion, which together define a seed passage. The first portion is located downstream from the second portion.

The first portion comprises a plastic cylindrical tube having a conduit engagement portion, a coupler tube and a circumferential latching engagement channel. A circumferential stop rim and a circumferential latching rim define the circumferential latching engagement channel. The circumferential latching rim is provided with a circumferential angled surface and a circumferential latching surface.

The second portion comprises a plastic cylindrical tube having conduit engagement portion, at least two integral resilient latching tongs, a seed cut off and a coupler sleeve. Each of the resilient latching tongs is provided with a resilient hinge, a handle and a latch, each latch having a canted surface. The seed cut off comprises a tower having a slot in which is located a sliding gate. The sliding gate has an open position corresponding to the open condition of the seed cut off and a closed position corresponding to the closed condition of the seed cut off.

In coupling the first portion to the second portion, the first portion is driven towards the second portion so that the coupler tube of the first portion is nested inside the coupler sleeve of the second portion. During this movement the canted surfaces of the latches engage the circumferential angled surface of the latching rim automatically opening the latches. The biasing force of the resilient hinge closes the latches when the latches encounter the circumferential latching surface. The operator would then move the sliding gate to its open position allowing seed to pass through the seed passage.

To detach one portion of the conduit from another, the operator closes the sliding gate by sliding it to its closed position, the operator then pinches the handles of the tongs inward to release the latches, and finally the operator separates the first portion form the second portion.

DETAILED DESCRIPTION

Figure 1:
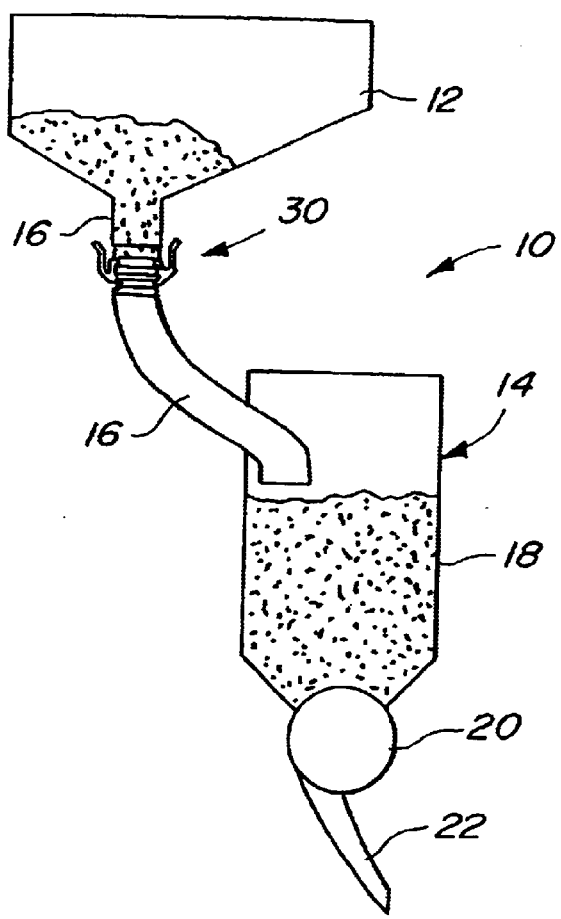
FIG. 1 is a schematic view of an agricultural seeder.

The agricultural seeding machine 10, schematically illustrated in FIG. 1, comprises a main seed hopper 12 a plurality of planting units 14 (only one shown) and a seed carrying tube 16 extending between the seed hopper 12 and the planting units 14. Seed in the main hopper 12 passes through the seed carrying conduit 16 to the planting units 14. The seed may be carried through the conduit by pneumatic pressure and/or by gravity. Seed from the conduit passes into a planting unit hopper 18. The planting unit hopper 18 directs seed to the seed meter 20. From the seed meter 20 the seed is directed through seed tube 22 to a planting furrow formed by a furrow opener, not shown. The planting furrow containing the metered seed is collapsed by a furrow closing system, also not shown. Seed from the main hopper could be metered before passing into the seed carrying conduit. In this configuration the metered seed is carried by the seed carrying conduit directly to the planting furrow.

The seed carrying conduit 16 is coupled to the main seed hopper 12 by a detachable coupler 30. The detachable coupler has a first portion 32 comprising the male portion of the coupler and a second portion 34 comprising the female portion of the coupler. In the embodiment illustrated in FIG. 1 the first portion 32 of the coupler is coupled to the downstream side of the seed carrying conduit 16 and the second portion 34 of the coupler is coupled to the upstream side of the conduit 16 adjacent to the main seed hopper 12. It should be noted that the coupler could be located at any location along the seed carrying tube 16. The first portion 32 can be directly mounted to the planting unit 14 or the second portion 34 can be directly mounted to the outlet of the main seed hopper 12. The first and second portions 32 and 34 and the conduit 16 define a seed passage 36 through which the seed passes.

Figure 3:
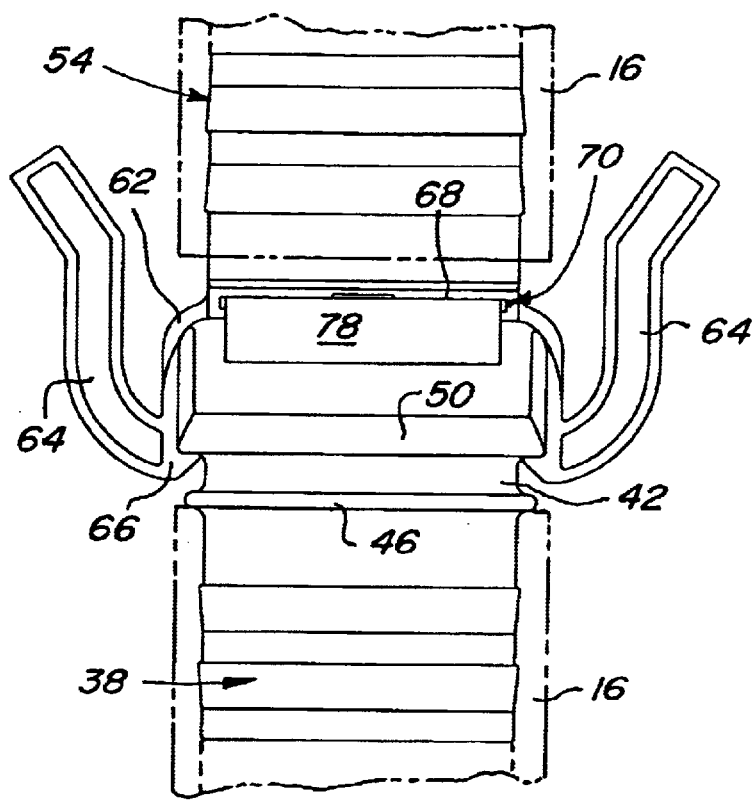
FIG. 3 is a plan view of the coupler in its engaged position.
Figure 4:
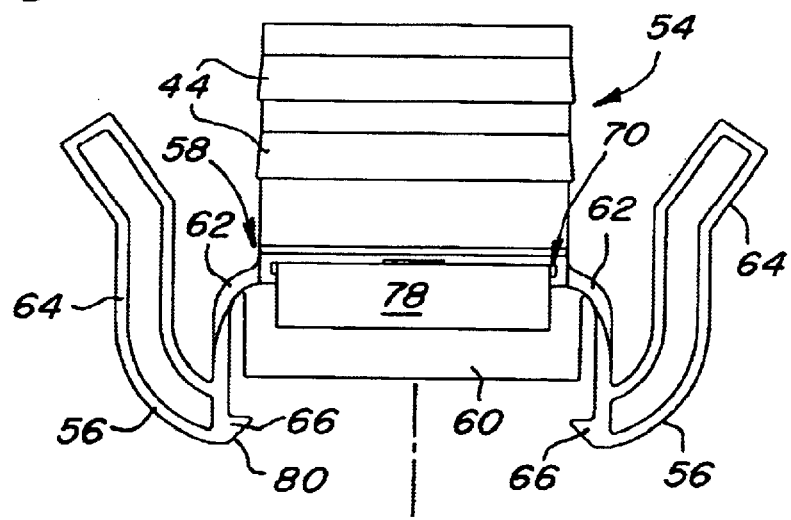
FIG. 4 is a plan view of the coupler disengaged.
Figure 4:
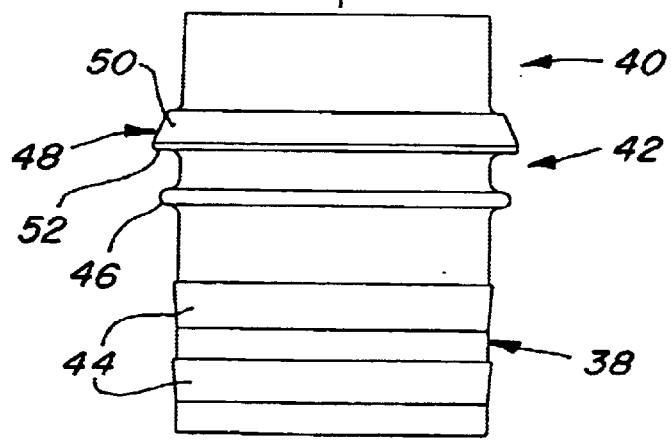

The first portion 32 comprises a cylindrical plastic tube having a conduit engagement portion 38, a coupler tube 40 and a latching engagement channel 42. The conduit engagement portion 38 is provided with two circumferential gripping ribs 44 for gripping the interior of conduit 16. The latching engagement channel 42 is defined by a circumferential stop rim 46 and a circumferential latching rim 48. The conduit 16 abuts the conduit side of the stop rim 46, as shown in FIG. 3. The circumferential latching rim has a circumferential angled surface 50 that radially expands towards a circumferential latching surface 52.

The second portion 34 of the coupler comprises a cylindrical plastic tube having a conduit engagement portion 54, integral resilient latching tongs 56, a seed cut off 58 and a coupler sleeve 60. As with the conduit engagement portion 38 of the first portion 32 the conduit engagement portion 54 of the second portion 34 is provided with two circumferential gripping ribs 44 for gripping the interior of the conduit 16. Each latching tong 56 is provided with a resilient hinge 62, a handle 64 and a latch 66. In its latched condition, the coupler tube 40 of the first coupler portion 32 is inserted into the coupler sleeve 60 of the second portion 34.

Figure 2:
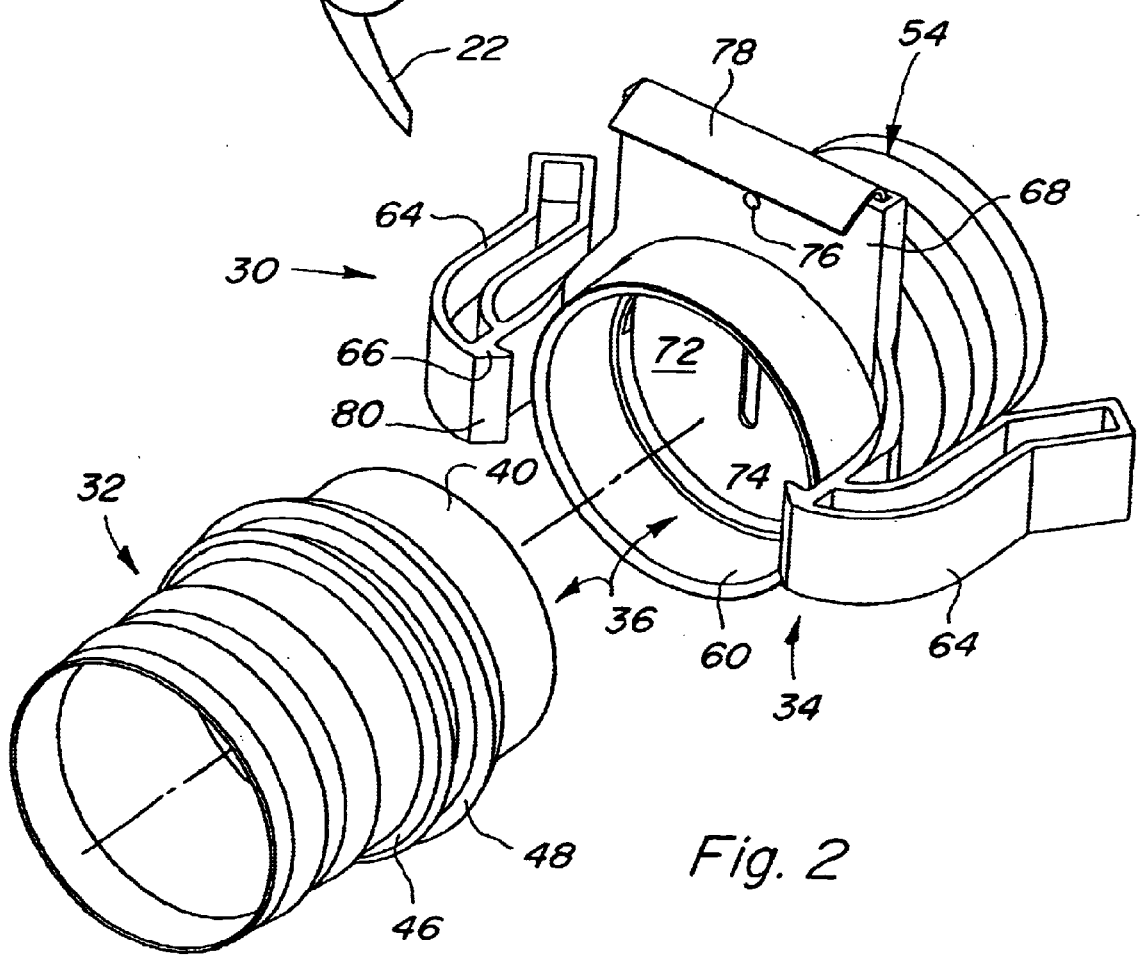
FIG. 2 is a perspective view of the seed carrying tube coupler.

The seed cut off 58 comprises a tower 68 located between the conduit engagement portion 54 and the coupler sleeve 60. The tower 68 is provided with a slot 70 that extends into the seed passage 36. A sliding gate 72 is slidably positioned in the slot 70. The sliding gate 72 is provided with a guide slot 74 for receiving a guide pin 76 located on tower 68. The guide pin 76 may comprise a bolt or screw. The sliding gate 72 is also provided with a hand grip 78. The sliding gate 72 has a closed position, illustrated in FIG. 2, and an open position. In its closed position the sliding gate is fully inserted into the slot 70 stopping the flow of seed from the main hopper 12 to the planting unit hopper 18. In its open position the sliding gate 72 is retracted from the slot to permit the passage of seed.

In coupling the first portion 32 to the second portion 34, the first portion 32 with conduit mounted thereto is driven towards the second portion 34 so that the coupling tube 40 enters the coupling sleeve 60. The latches 66 of the latching tongs 56 are provided with a canted surface 80 that cooperates with the circumferential angled surface 50 to bias the latches 66 outwardly. The latches 66 pass over the circumferential latching rim 48 until they automatically engage the circumferential latching surface 52. At this point the resilient nature of the tongs 56 snap the latches 66 into engagement. The operator then would open the seed cut off 58 by pulling the sliding gate 72 outwardly from the tower 68. The guide pin 76 prevents the sliding gate 72 from being completely removed from the tower 68.

To uncouple the conduit 16, first the operator closes the sliding gate 72 by pushing it inwardly, second the operator pinches the handles 64 inwardly to release the latches 66 from the circumferential latching surface 52, and finally the first portion 32 is pulled from the second portion 34.

Having described the preferred embodiment, it will become apparent that various modifications can be made without departing from the scope of the invention as defined in the accompanying claims.

I claim:

1. A detachable coupler for a seed carrying conduit of an agricultural seeding machine, the detachable coupler having a coupled condition and an uncoupled condition, the detachable coupler defining a seed passage when the detachable coupler is in its coupled condition, the detachable coupler comprising:
   a first portion having a circumferential latching engagement channel that is provided with a circumferential latching surface;
   a second portion having at least two integral resilient latching tongs, each latching tong is provided with a handle, a resilient hinge and a latch, the latch being designed to engage the circumferential latching surface when the coupler is in its coupled condition, the second portion is also provided with a seed cut off having an open condition allowing seed to pass through the second portion, and a closed condition where seed is prevented from passing through the second portion.

2. A detachable coupler as defined by claim 1 wherein the first portion is downstream from the second portion.

3. A detachable coupler as defined by claim 2 wherein the first portion is provided with a conduit engagement portion.

4. A detachable coupler as defined by claim 3 wherein the first portion is provided with a coupler tube and the second portion is provided with a coupler sleeve, the coupler tube being received in the coupler sleeve when the coupler is in its coupled condition.

5. A detachable coupler as defined by claim 4 wherein the seed cut off is provided with a sliding gate, the sliding gate is slidingly received in a slot formed in the second portion, the sliding gate having an open position and a closed position, the open position corresponding to the open condition of the seed cut off and the closed position corresponding to the closed condition of the seed cut off.

6. A detachable coupler as defined by claim 5 wherein the second portion is provided with a tower, the slot being formed in the tower.

7. A detachable coupler as defined by claim 6 wherein the tower is provided with a guide pin and the sliding gate is provided with a guide slot, the guiding pin being received in the guide slot.

8. A detachable coupler as defined by claim 7 wherein the sliding gate is provided with a hand grip.

9. A detachable coupler as defined by claim 8 wherein the second portion is provided with a conduit engagement portion, the conduit engagement portion of the first portion and the conduit engagement portion of the second portion are provided with circumferential gripping ribs for engaging the conduit.

10. A detachable coupler as defined by claim 5 wherein the first portion is provided with a circumferential latching rim having a circumferential latching surface that is engaged by the latches of the latching tongs when the coupler is in its coupled condition.

11. A detachable coupler as defined by claim 10 wherein the circumferential latching rim is provided with an angled surface and each latch is provided with a canted surface, when coupling the first portion to the second portion the canted surfaces engage the circumferential angled surface biasing the latches apart.

12. A detachable coupler as defined by claim 11 wherein the first portion is provided with a circumferential stop rim, the circumferential latching rim and the circumferential stop rim defining the latching engagement channel.

13. A second portion of a detachable coupler for a seed carrying conduit of an agricultural seeding machine, the detachable coupler having a coupled condition and an uncoupled condition, the detachable coupler defining a seed passage when the detachable coupler is in its coupled condition, the second portion of the detachable coupler comprising:
   a cylindrical tube;
   at least two integral resilient latching tongs are located on the tube, each latching tong is provided with a handle, a resilient hinge and a latch;
   a seed cut off is located on the tube, the seed cut off having an open condition allowing seed to pass through the second portion and a closed condition where seed is prevented from passing through the second portion.

14. A second portion as defined by claim 13 wherein the tube is provided with a coupler sleeve.

15. A second portion as defined by claim 14 wherein the seed cut off is provided with a sliding gate, the sliding gate is slidingly received in a slot formed in the second portion, the sliding gate having an open position and a closed position, the open position corresponding to the open condition of the seed cut off and the closed position corresponding to the closed condition of the seed cut off.

16. A second portion as defined by claim 15 wherein the tube is provided with a tower, the slot being formed in the tower.

17. A second portion as defined by claim 16 wherein the tower is provided with a guide pin and the sliding gate is provided with a guide slot, the guiding pin being received in the guide slot.

18. A second portion as defined by claim 17 wherein the sliding gate is provided with a hand grip.

19. A second portion as defined by claim 18 wherein the tube is provided with a conduit engagement portion, the conduit engagement portion being provided with circumferential gripping ribs for engaging the conduit.

20. A second portion as defined by claim 19 wherein the latches of the tongs are provided with a canted surface.

* * * * *